Feb. 26, 1924.

J. C. FRENCH

TRACTOR

Filed Feb. 5, 1918

Witnesses:
Robert H. Weir
Arthur W. Carlson

Inventor
James C. French
By Arthur L. Durand
Atty.

Feb. 26, 1924.
J. C. FRENCH
TRACTOR
Filed Feb. 5, 1918
1,484,637
3 Sheets-Sheet 2
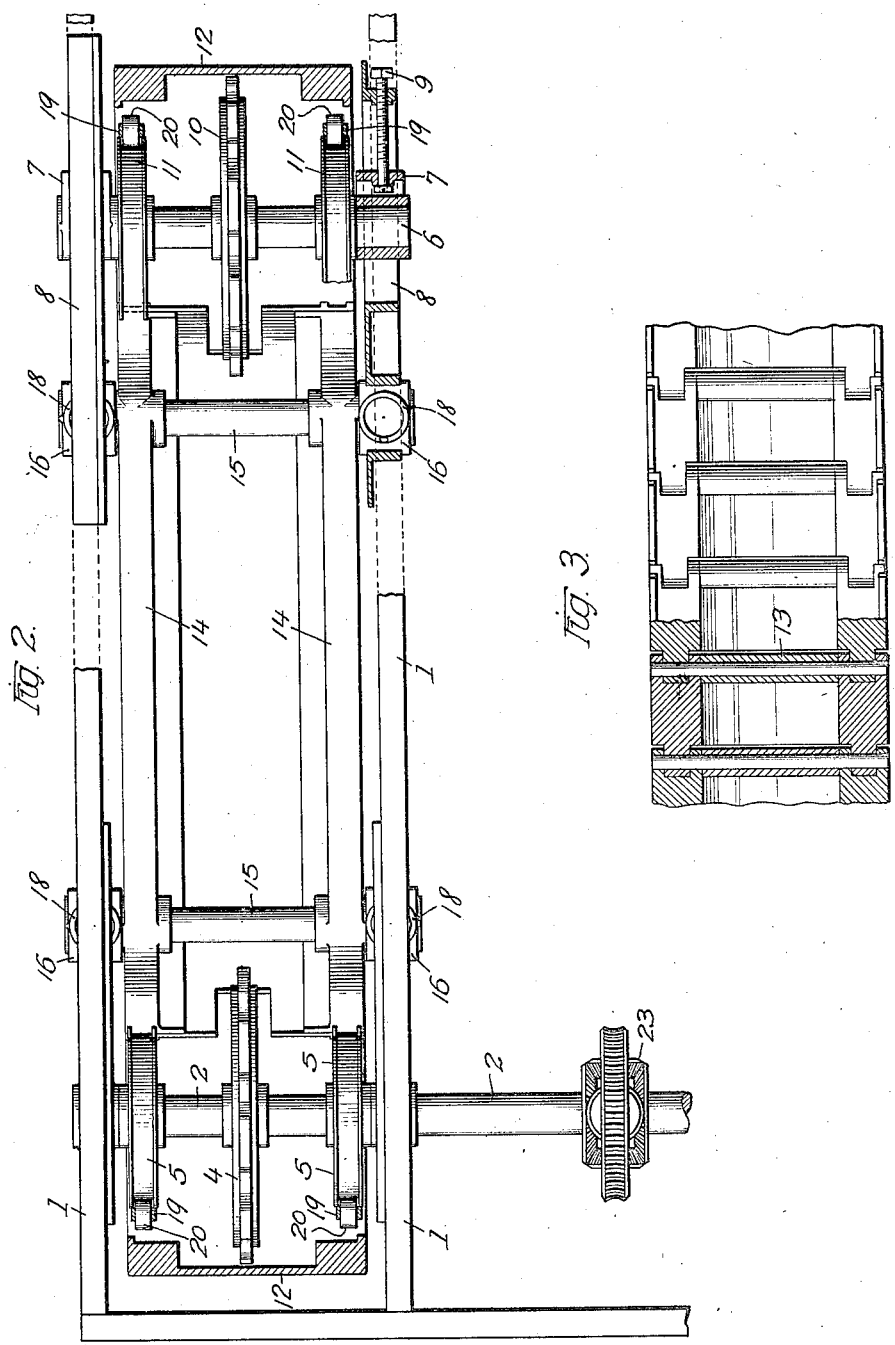

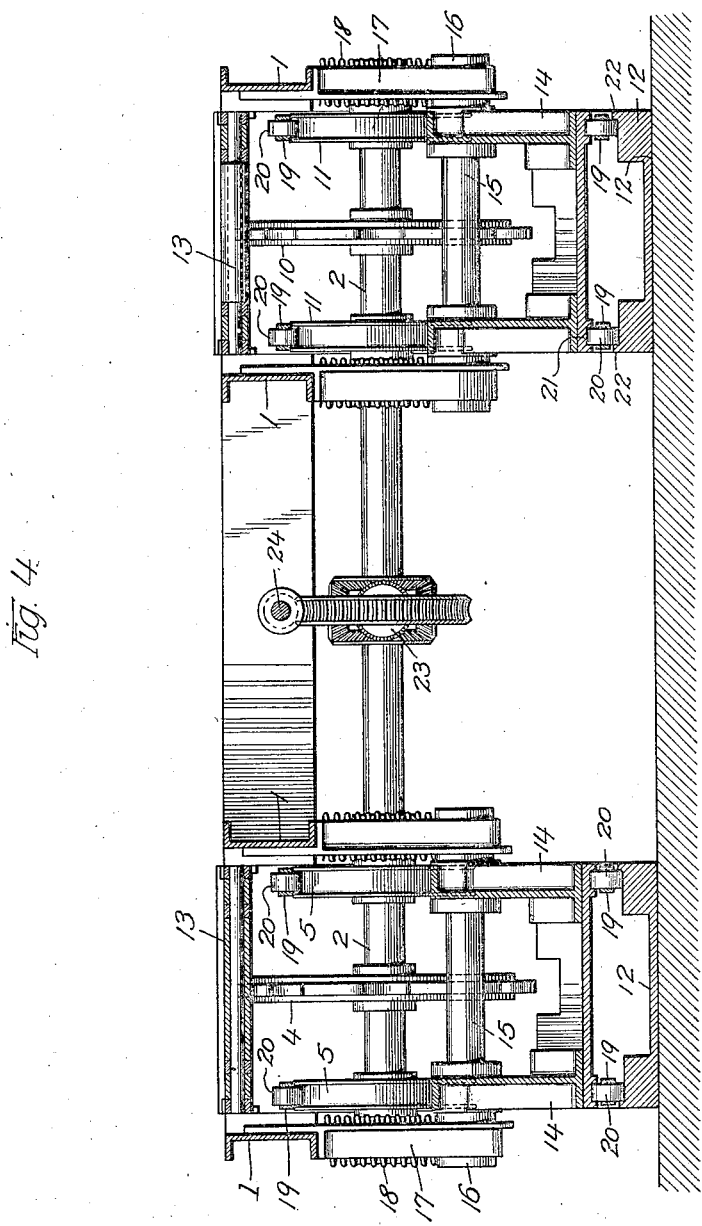

Patented Feb. 26, 1924.

1,484,637

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

TRACTOR.

Application filed February 5, 1918. Serial No. 215,433.

*To all whom it may concern:*

Be it known that I, JAMES C. FRENCH, a citizen of the United States of America, and resident of Chicago, county of Cook, and State of Illinois, have invented a certain new and useful Improvement in Tractors, of which the following is a specification.

This invention relates to tractors of that kind in which the weight of the chassis or body frame of the tractor is sustained by a shoe which rests upon the lower portion of the endless traction belt, rollers or other anti-friction means being interposed between the top surface of said belt and the bottom of said shoe.

Generally stated, the object of the invention is to provide a novel and improved tractor of the foregoing general character.

A special object is to provide an improved construction and arrangement whereby said shoe is supported and arranged in a novel and satisfactory manner, thereby to yieldingly impose the weight of the chassis or body upon the shoe and upon the endless belt.

It is also an object to provide certain details and features of construction and combinations tending to increase the general efficiency and desirability of a tractor of this particular character.

In the accompanying drawings:—

Figure 2 is a plan of said mechanism, showing certain portions in horizontal section, being a section on line 2—2 in Figure 1.

Figure 3 is an enlarged detail fragmentary sectional view of a portion of the endless traction belt.

Figure 4 is a vertical transverse section on line 4—4 in Figure 1.

Figure 1:
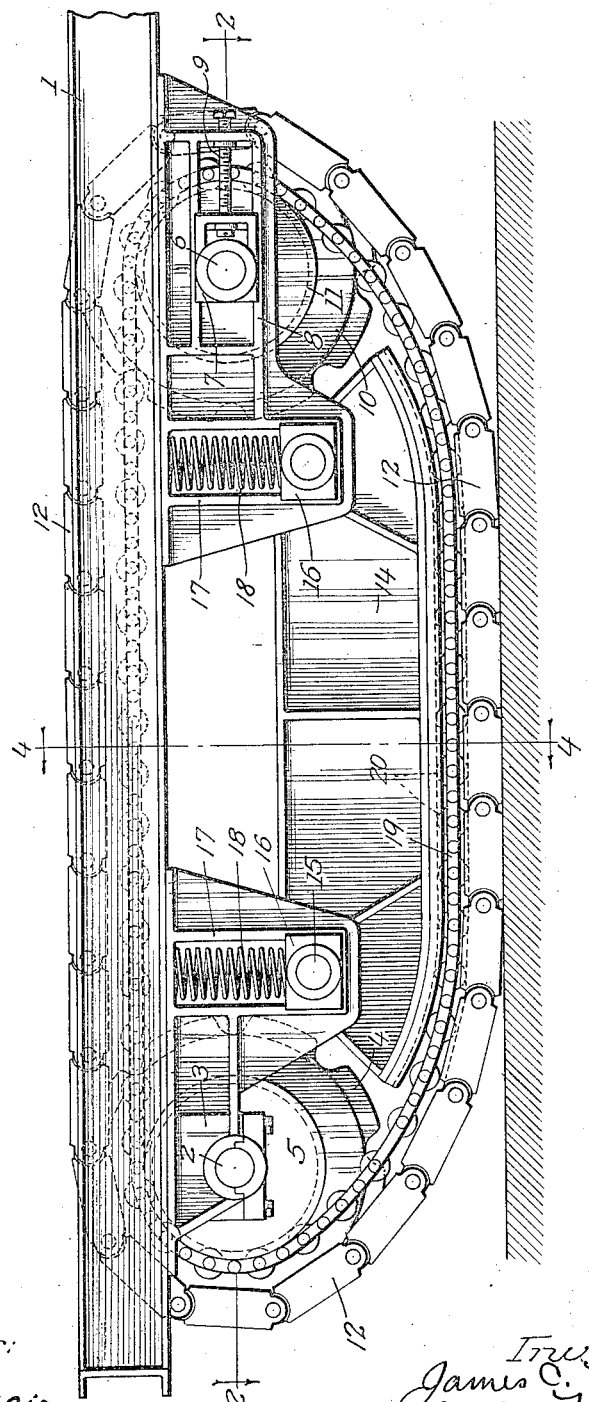
Figure 1 is a side elevation of a tractor mechanism embodying the principles of the invention.

As thus illustrated, the invention comprises a body frame or chassis 1, of any suitable character, provided at its rear end with a transverse axle 2 supported in bracket bearings 3 secured to the underside of said frame. Said axle is provided with sprocket-wheels 4, one at each side of the tractor, and grooved idlers 5 are mounted to rotate loosely on said axle, there being one of these idlers at each side of each sprocket-wheel. A short axle 6 is disposed a distance ahead of each sprocket-wheel 4, and supported in adjustable bearings 7, which latter are in turn supported in longitudinal guides 8, or in any suitable manner. Adjusting screws 9 are provided and suitably arranged for moving the bearings 7 toward and away from the axle 2, in order to regulate the traction belt. Each axle 6 is provided with a sprocket-wheel 10, and each axle 6 has a pair of loose grooved idlers 11, which latter are in line with the idlers 5 previously described. The endless traction belt 12 is composed of links and is mounted on the sprocket-wheels 4 and 10, being provided along its central portion with transverse rollers or sleeves 13 to be engaged by the teeth of said sprocket-wheels. It will be understood, of course, that the tractor as a whole comprises an endless traction belt 12 at each side of the chassis or body frame, so that these belts take the place of the usual driving wheels of a motor truck, if desired, or they may constitute the means for propelling an excavator or other heavy body. Each belt 12 has a shoe 14 by which the weight of the chassis or body is imposed on the lower portion of the endless belt. This shoe is supported on transverse pins 15, inserted through the opposite ends of the shoe, and these pins have their opposite ends provided with blocks or bearings 16 which are adapted to slide up and down in the vertically disposed guides 17, which latter are preferably integral with the bearings 3 and the guides 8, being in the form of castings secured to the underside of the body frame. Springs 18 bear upon the tops of the blocks or bearings 16, so that the weight of the chassis or body frame is communicated through these springs to the shoe 14, whereby the latter sustains practically all the weight and communicates the same to the lower portion of the endless traction belt. For each traction belt there is a pair of endless sprocket-chains 19, which travel around the idlers 5 and 11, and which are provided with rollers 20 which travel in parallel grooves 21 on the bottom of the shoe 14, and immediately inside of flanges 22 formed along the edges of the endless traction belt. In this way, friction between the shoe 14 and the traction belt 12 is practically eliminated, the shoe 14 communicating the weight through these rollers to the traction belt.

Any suitable means can be employed for operating the axle 2 for the purpose of driving the traction belts. As shown, a differential gearing 23, of any suitable or known or approved character, is provided for this purpose, and is operated by a longitudinally disposed shaft 24, this arrangement being like that of an ordinary automobile or motor truck, whereby either belt 12 may travel faster than the other.

In operation, the traction belts travel over the surface of the ground, with the weight practically all upon the horizontal lower portion of each belt, the sprockets 4 and 10 being high enough to prevent them from resting upon the ground. The opposite ends of the shoe 14 are preferably turned upward a distance, so that this shoe is runner-shaped at each end, and in passing over an obstruction the pressure will be exerted upwardly on the belt, ordinarily, at a point about opposite the end of the shoe 14; but, of course, a larger obstruction would engage the belt higher up and at a point where the pressure would be exerted against the sprocket-wheel 10, if the machine is moving forward, or against the sprocket-wheel 4, if the machine is moving backward. However, under normal conditions, the axles 2 and 6 practically sustain no weight, the entire weight of the body frame or chassis being communicated through the springs 18 to the shoes 14, and then through the rollers 20 to the flat or horizontal lower portion of the traction belt.

With this arrangement, therefore, the traction belts have a certain flexibility, as they travel over an uneven surface of the ground, and there is an upward yielding action in a beneficial manner, at either end of the shoe 14, so that the passage of either belt over an obstruction is characterized by a certain yielding action which relieves strain and tends to prevent breakage of the parts, and whereby both belts readily accommodate themselves to rough or uneven surfaces over which the motor truck or excavator or other machine may be compelled to travel.

What I claim as my invention is:—

1. In a tractor, a body frame, a rear axle supported in bearings on said frame, a belt-wheel on said axle, a front axle, a belt-wheel on said front axle, an endless traction belt on said belt-wheels, a shoe to communicate the weight of said body frame to the lower portion of said belt, a spring to support the body frame on the front end of said shoe, a spring to support the body frame on the rear end of said shoe, so that the entire load weight is communicated through said springs to the shoe, permitting the shoe and body frame to move bodily toward each other, and whereby either end of said shoe may tilt upward and vertical guides for the front and rear ends of said shoe.

2. A structure as specified in claim 1, and means to support said front axle on the body frame.

3. A structure as specified in claim 1, in combination with an endless chain provided with rollers to travel between said shoe and said belt, so that said rollers support said shoe directly on the lower portion of the belt, and means to support the upper portions of said endless chain.

4. A structure as specified in claim 1, in combination with an endless chain provided with rollers to travel between said shoe and said belt, and means on said axles to support said endless chain.

5. In a tractor, a body frame, an endless traction belt, a member to support the entire load weight on the lower portion of said belt and movable between the normal upper and lower runs of the belt, springs at opposite ends of said member to communicate the entire load weight thereto, vertical guides for the front and rear ends of said member, antifriction means between said member and the belt, and mechanism for supporting and operating the belt.

6. A structure as specified in claim 6, said mechanism comprising front and rear rotary members supported on the body frame, in front and rear of said vertical guides.

Signed by me at Chicago, Cook County, Illinois, this 18th day of January, 1918.

JAMES C. FRENCH.